United States Patent [19]

Palmer et al.

[11] Patent Number: 4,833,480

[45] Date of Patent: May 23, 1989

[54] SHORT RANGE RANGING SYSTEM

[75] Inventors: Ronald J. Palmer; Leonard Fischer, both of Regina, Canada

[73] Assignee: Accutrak Systems Limited, Saskatchewan, Canada

[21] Appl. No.: 916,696

[22] Filed: Oct. 8, 1986

[30] Foreign Application Priority Data

Oct. 8, 1985 [CA] Canada .................................. 492523

[51] Int. Cl.⁴ ............................................ G01S 13/38
[52] U.S. Cl. .................................... 342/125; 342/127
[58] Field of Search ................ 342/125, 126, 127, 46, 342/453, 457, 458; 364/443, 449; 367/99, 125; 356/5

[56] References Cited

U.S. PATENT DOCUMENTS

3,780,370 12/1973 Reeves ............................. 342/125 X
4,011,562 3/1977 Bruce ............................. 342/125 X Primary Examiner—Nelson Moskowitz
Assistant Examiner—Gilberto Barrón, Jr.
Attorney, Agent, or Firm—Antonelli, Terry & Wands

[57] ABSTRACT

An accurate ranging system for position determination of a mobile unit using trilateralization. A pair of active reflectors return signals transmitted by the mobile unit in phase at the reflectors, after compensating for interval circuit delay. The mobile unit compares the phases and determines mutual distances and thus its position. The invention includes a two frequency technique for compensating for inaccuracies introduced at distances in excess of one wavelength and for inaccuracies observed at a large multiple of wavelengths, and also includes means for dynamically compensating for drift.

12 Claims, 3 Drawing Sheets

SHORT RANGE RANGING SYSTEM

This invention relates to a system for determining the precise position of a vehicle, and in particular to such a system which uses a pair of active reflectors of a signal transmitted by a transmitter carried by the vehicle, for trilateralization based on phase comparison of the transmitted and reflected signals.

Automated farming requires a short range vehicle locating system by which the position of a tractor, for example, can be precisely known within a few inches, as it traverses and works a field. In manually traversing the field, the farmer typically overlaps worked rows in order to ensure that gaps are not left where seeds are not planted, herbicide is not deposited, or where fertilizer is not deposited. Overlap of about three feet over a strip worked by a thirty foot implement is typical; thus about 10% of the land is reworked. This clearly is wasteful of the farmer's time, seed, fertilizer, etc., and therefore of money.

The present invention is a system for measuring the distance between active reflectors and a transmitter carried by a vehicle such as a tractor, and this can be used in a trilateralization system for a locating vehicle in a field so precisely that nearly all overlap can be eliminated. A position indicator can be located in the cab at the tractor, and can be used to indicate to the farmer precisely where to steer the tractor, or alternatively to operate the tractor automatically, and thus be used as a guidance system.

Many systems exist for locating the position of a vehicle or object, such as radar, sonar, etc. Such systems typically use a measure of the transit time of a signal burst transmitted from a transmitter and reflected from a vehicle or object to be detected to determine its distance from the transmitter. Such systems are useful for applications in which precision measured to the inch or few inches is not necessary. Short range systems such as are used in surveying use other techniques, for example distinguishing the phase difference between a transmitted and a reflected signal (and are normally limited to line-of-sight and in the case of use of lasers are affected by dust, atmospheric effects, etc.), or between a transmitted signal and a signal at the target retransmitted in phase at the target with the signal incident at the target (see U.S. Pat. No. 4,083,047 issued Apr. 4th, 1978).

Such systems can use trilateralization to derive an indication of the location of a vehicle carrying the transmitter relative to a pair of reflectors, e.g. see the U.S. patent noted above or Canadian Pat. No. 999,667 issued Nov. 9th, 1976.

The system described in U.S. Pat. No. 4,083,047 can measure distance to a resolution of slightly under 3 feet, which may be sufficient to keep the disclosed vehicle on track, but is insufficient to prevent working overlap to a maximum of 1 to 2 inches, particularly at significant distances. In addition if the system were to simply measure the phase difference of a transmitted and received CW signal, it could not resolve the distance if it were greater than 1 wavelength. Further, because it is a relatively coarse resolution system, changes in internal circuit time delay with temperature, component drift, etc. is of no consequence. A fixed internal circuit time delay is merely assumed yet drift can markedly affect the positioning accuracy.

The present invention is a system which uses CW signals and resolves the multiple wavelength ambiguity, while at the same time measures and compensates for changes in internal circuit delay not only of the active reflectors but also of the transmitter. In addition the active reflectors and transmitter contain sufficient electronic intelligence that the tractor carrying the transmitter need not travel paths which are perpendicular to a base line joining the two active reflectors as is required in the aforenoted U.S. patent. Indeed, the reflectors can measure the distance between themselves automatically and relay this information to the transmitter. The position of the transmitter has been determined by means of this system to an accuracy of less than 2 inches and to a distance at least hundreds of wavelengths from the reflector with a maximum range that appears to be limited only by the signal transmission and reception range.

In order to precisely locate the vehicle according to the present invention, a transmitter (master mobile unit, or MMU) transmits a continuous wave (CCW) signal to two stationary active slave reflectors (SSTs) spaced a defined distance apart. At each SST the transmitted signal is received, and a local oscillator is caused to generate a signal which is in phase with the signal received thereat. After termination of the signal transmitted from the MMU, each SST in turn transmits the signal generated by its local oscillator, which is received at the MMU. The MMU determines the phase difference between its transmitted signal and the received signals, and thus to a first level of accuracy, the phase difference represents the transmission time from the MMU to an SST and return.

Distance derivation based on the above will be inaccurate for several reasons. Firstly there is a circuit phase delay within each SST which retards the phase of the return, or reflected signal. The present invention incorporates a measurement technique conducted during an initialization phase in the field for accurately determining the circuit phase delay within each SST, which can be used to advance the phase of the return signal to compensate for the circuit phase delay, or can transmit the value of the circuit phase delay to the MMU, where it can be subtracted from the measured phase differential. The same problem occurs at the MMU which is dealt with in a similar manner.

A further source of error can occur if the distance between the MMU and SST is more than one wavelength of the transmitted signal. By transmitting the CW signal at two different frequencies consecutively, the multiple wavelength inaccuracy can be resolved to a certain wavelength multiple.

Another inaccuracy results from movement of the vehicle which carries the MMU. Since the transmissions from the MMU and SST to each other are sequential, and thus are transmitted at different times, for an MMU mounted on a tractor or combine there would be movement between transmission and reception of the reflected signal, and therefore the distance determination would be inaccurate. To overcome this problem two transmissions are made from the MMU at each frequency, one before the return transmission from the SST and one following the return transmission. Averaging of the phase shift readings resulting from each frequency is used to determine the phase shift at the same time as the return transmission. This has been found to be sufficiently accurate for slow moving vehicles such as those which work a farm.

Should the distance between the MMU and SST be in excess of the aforenoted wavelength multiple, another distance ambiguity exits. This is resolved in the present invention by introducing a discontinuity into the CW signal. The timing, from its transmission to an actively reflected corresponding discontinuity with the measured circuit delay subtracted, is used to distinguish the approximate transmitter location. The signal discontinuity preferred is a sudden 180° phase shift in the CW signal, although other detectable discontinuities can be used.

The two frequency phase differential technique and the discontinuity timing techniques noted above provides the required degree of accuracy, e.g. to an accuracy of about 1½ inches. This is sufficient to accurately determine the position of the MMU by trilateralization for most farmer's fields.

In order to achieve the above, an embodiment of the invention is a ranging system for determining the distance between a transmitter and a reflector for use in a trilteralization position determing system comprising a first circuit for transmitting a continuous wave (CW) signal for a predetermined period of time, an active remote reflector for generating and transmitting a first reflection signal at least initially in phase at the reflector with the first CW signal following transmission of the first CW signal, and apparatus at the first circuit for receiving the reflection signal and comparing its phase with the phase of the first CW signal whereby an apparent distance between the first circuit and the reflector can be determined. The first circuit includes apparatus for generating a second CW signal for a predetermined period of time which has a frequency which is a very large fraction of the first CW signal. The reflector includes apparatus for generating and transmitting a second reflection signal initially in phase at the reflector with the second CW signal following transmission of the second CW signal. Apparatus at the first circuit is provided for receiving the second reflection signal and comparing its phase to the second CW signal. Further apparatus at the first circuit provides a distance indicating signal corresponding to one half of a result obtained by subtracting the phase differences of the first CW signal and received first reflection signal and the second CW signal and received second reflection signal and multiplying the result by the wavelength of the first CW signal divided by the difference of the wavelength of the first and second CW signal.

According to a more particular embodiment the ranging system is comprised of a first transmitter for transmitting a first continuous wave (CW) signal for a predetermined period of time. An active reflector remote from the transmitter is comprised of apparatus for receiving the CW signal, a phase locked loop for receiving a signal corresponding to the CW signal from the receiving apparatus and locking its phase thereto, and a second transmitter for transmitting a first CW reflection signal at the same frequency as the first continuous wave (CW) frequency with an initial phase defined by the phase locked loop, after termination of the CW signal. Apparatus at the first transmitter receives the CW signal and the reflection signal and compares the phases of the CW signal and the reflection signal and provides a signal corresponding to the distance between the transmitter and active reflector related to the phase difference thereof.

At the active reflector the phase locked loop is locked to the incoming CW signal and controls the frequency of a local oscillator. Following termination of the CW signal the local oscillator is allowed to free run, generating the reflection signal which is at least initially in phase with the CW signal received at the active reflector. The phase of this signal when received at the first transmitter is compared with the phase of the CW signal transmitted therefrom in order to determine the phase difference, and therefore the time of twice the distance between the first transmitter and the active reflector, which is divided by 2. A large number of comparisons are made, e.g. 16, and should the frequency of the local oscillator of the active reflector drift, the MMU will detect progressively changing phase shift differentials. These progressive phase shift differentials are extrapolated by a microcomputer back to the time of initial transmission of the reflection signal, which can provide the correct value.

The signal transmitted from a transmitter is fed back to its own receiver and compared with the phase of the internally generated signal. Since within the phase locked loop phase shift is introduced to lock the phase of the internally generated signal, this phase shift, and the phase difference between the transmitted signal received by the local receiver with the phase of the internally generated signal provides a precise indication of the internal circuit phase shift. These values are used as compensation factors as noted earlier.

It is preferred that the structure of the basic MMU and SSTs should be identical, except for software and certain additional interface structures at the MMU, thus keeping cost to a minimum. The detailed description below of the basic structure of the preferred embodiment will thus suffice for all three units. Communication will be described between a single SST and the MMU. However it should be recognized that communication between the MMU and the other SST will be similar, and indeed communication can similarly be effected between the SSTs in order to establish their distance one from the other. In the latter case one SST will temporarily act as an MMU and transmits a signal which indicates its determined distance from the other SST to the man MMU.

A detailed description of the preferred embodiment of the invention will be found below, with reference to the following drawings, in which.

Figure 1:
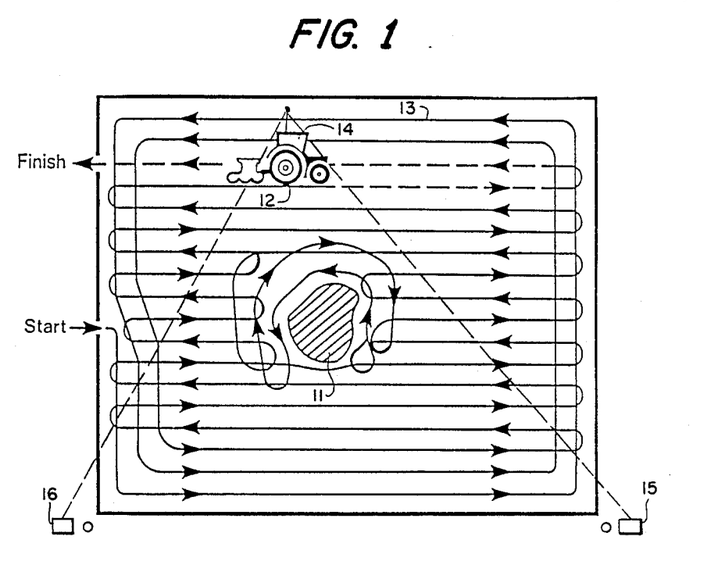
FIG. 1 is a plan view of a field illustrating how the invention is preferred to be used.

Turning to FIG. 1, a field 10 is shown having a natural obstacle 11. A tractor 12 traverses the field along a path 13. The tractor carries a master mobile unit (MMU), which transmits to and receives from two active signal reflectors, being stationary slave transceivers (SSTs) 15 and 16. The field is shown with four base lines forming a rectangle around it, and a point 0 at each end of one base line. Both SSSTs should be placed outside or at opposite sides of the field, and at or outside one base line, e.g. at points 0. The MMU transmits to each SST, and upon receiving a response, can determine its position relative to the SSTs, and therefore its position on the field by trilateralization.

It is preferred that initially a map of the field should be stored in an electronic memory of the MMU. In order to store the map the tractor on which the MMU is located should be driven around the periphery of the field, thus marking the external boundaries outside of which the tractor should not be driven. In addition, any obstacles such as obstacle 11 should be driven around to mark an external boundary inside of which the tractor should not be driven. By the use of this map, a tractor controller can use the position indications obtained as a result of the ranging system to automatically steer the tractor within the outer bounds of the field and outside the bounds of any obstacles.

Figure 2A:
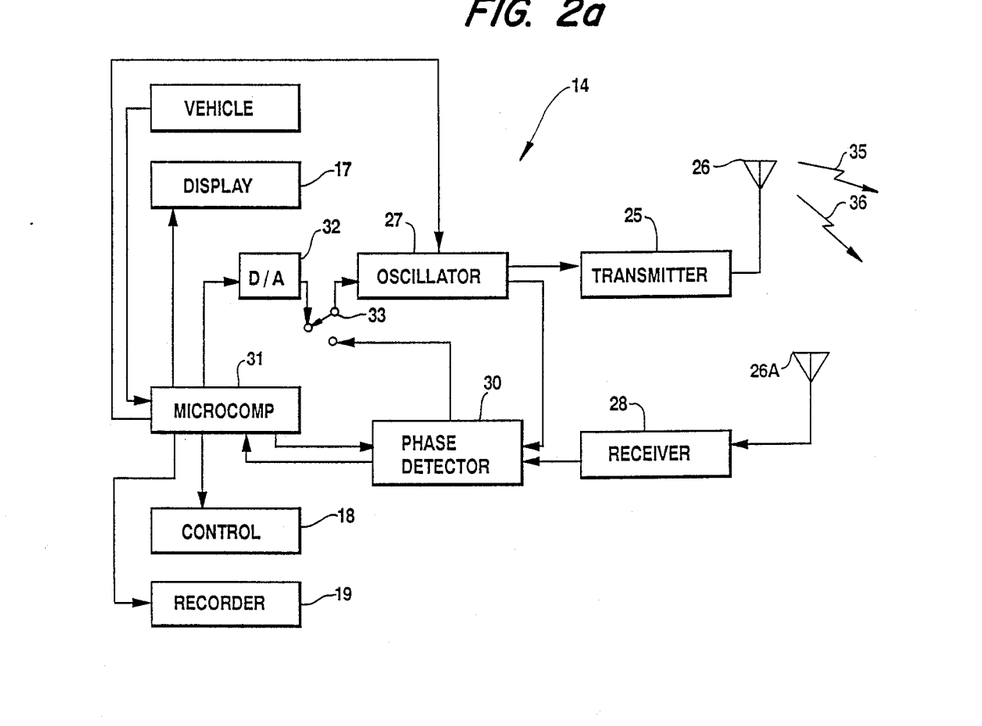
FIG. 2a is a block diagram of a master mobile unit (MMU)
Figure 2B:
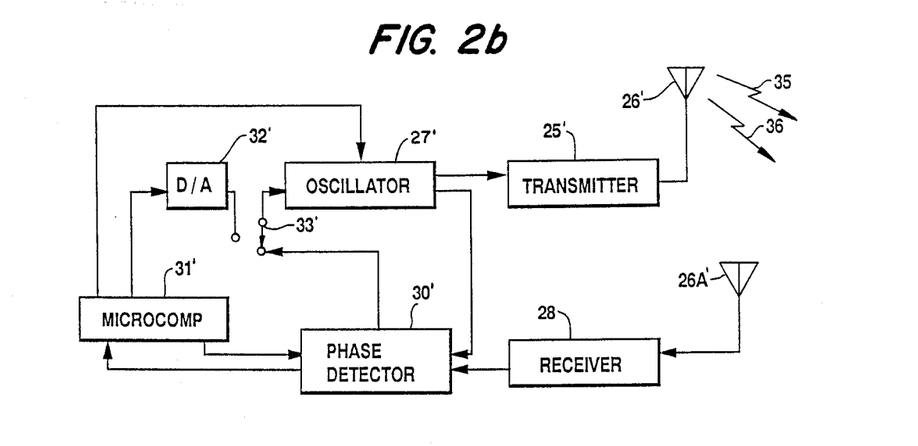
FIG. 2b is a block diagram of a stationary transceiver (SST)

FIG. 2a illustrates a general block diagram of the MMU, while FIG. 2b illustrates a general block diagram of an SST.

Referring now to FIG. 2a, a transmitter 25 drives an antenna 26 by a signal generated in an oscillator 27. A receiving antenna 26A is connected to the input of a receiver 2. The output of receiver 28 as well as an output of oscillator 27 are connected to a pair of inputs of a phase detector 30. An output of phase detector 30 is connected to an input of microcomputer 31, as well to an input of oscillator 27, the latter through switch 33. A data output of microcomputer 31 is connected through digital-to-analog converter 32 to switch 33, and control outputs of microcomputers 31 are connected to the phase detector 30 and oscillator 27. Switch 33 is connected to be able to select as inputs to oscillator 27 either the output of phase detector 30 or the output of digital-to-analog converter 32.

Oscillator 27 can provide two frequencies, which have been conveniently selected at about 27 MHz. The second frequency preferably is about 99% of the first frequency. In a successful prototype the first frequency was 27.125 MHz, while the second frequency was 26.85375 MHz. Signals generated by the oscillator at the two frequencies are shown as radiated signals 35 and 36.

A structure of the SST shown in FIG. 2b is similar to that of the MMU shown in FIG. 2a, and therefore need not be described separately. The like elements have been given similar reference numerals primed. However the switch 33 in the MMU of FIG. 2a is shown having the digital-to-analog converter 22 connected to the input of oscillator 27, while in the SST of FIG. 2b the input of oscillator 27' is connected to the output of phase detector 30'

It will be understood that there are several different sequences of operation of the MMU and SST which are controlled by the microcomputers 31 and 31', at various stages of operation. The basic sequence of operation to achieve the mutual distance indication will now be briefly described after a brief description of the circuit delay compensation sequence.

The MMU switch 33 connects the output of the phase detector 30 to the input of the oscillator 27, forming a phase locked loop. The microcomputer causes a delay element in the loop (not shown in FIGS. 2a and 2b, but to be described in more detail with respect to FIG. 3) to vary so as to ensure that the output signal of the oscillator 27 is in phase with a signal received at an input of the phase detector 30. The amount of variation is stored in a memory of the microcomputer. The same function is performed at the SST.

In another sequence microcomputer 31 enables oscillator 27 through its control lead to output a CW signal at one frequency, e.g. 27.125 MHz. This is transmitted by transmitter 25, e.g. signal 35, which is received by both antenna 26A of the MMU and antenna 26A' at the SST. At the MMU the signal passes into receiver 28 and is applied to one input of phase detector 30. The same signal is applied from oscillator 27 into the other input of phase detector 30. The phase detector 30 thus provides at its output to microcomputer 31 a phase differential indication representative of the phase shift caused by transmitter 35, antenna 36, antenna 26A, and receiver 28, with any serial associated circuitry. This will be considered as the circuit phase shift caused by the MMU itself, and is stored in a memory of microcomputer 31.

The SST, also performs the same function, storing the circuit phase shift of the SST 15 in the memory of microcomputer 31'. Since it is desirable to emit a signal 35' for reception by the MMU which would have been precisely in phase with the signal 35 immediately after its termination, microcomputer 31' controls phase detector 30' to change the phase of the signal generated by oscillator 27', e.g. by introducing a phase delay to the signal applied from phase detector 30' to oscillator 27'.

The signal received by antenna 26A' from antenna 26 has encountered a delay due to the transmission time from antenna 26, which directly corresponds to the distance between the MMU and the SST. This signal passes through receiver 28', and into one input of phase detector 30'. The output of phase detector 30' is connected to the input of oscillator 27' through switch 33A'. Under control of microcomputer 31', oscillator 27' is enabled, generating a signal at the primary frequency, e.g. 27.125 MHz. This is applied to the second input of phase detector 30'. Phase detector 30' with oscillator 27' form a phase locked loop, with the oscillator 27' being controlled by the phase detector 30' to be precisely in phase with the signal received from receiver 28'.

When signal 35 has terminated, microcomputer 31' causes oscillator 27' to free run and apply its signal to the input of transmitter 25', which applies it to antenna 26' for transmission to the MMU.

At the MMU the signal 35' is received by antenna 26A and passes into receiver 28 and phase detector 30. Here the phase is compared with the phase of the signal from oscillator 27, and the resulting phase differential signal is provided to an input of microcomputer 31. Microcomputer 31 subtracts the stored circuit phase of the MMU, (and the circuit phase delay of the SST, if it has been separately transmitted by an encoded signal, as will be described later). Since the resulting phase delay represents twice the transmission time, and therefore the distance between the MMU and SST, by using the velocity of the signal and its wavelength (known) stored as parameters in its memory the microcomputer by dividing by two can provide a signal representative of the distance between the MMU and SST with high precision.

At the MMU it is preferred that a display 17 should be connected to an output of microcomputer 31 in a well known manner, for display of the MMU location relative to the stored map of the field. If the MMU is used in a tractor guidance system, the microcomputer 31 can be connected to a vehicle steering control mechanism 18. It is also desirable to connect a recorder 19, which e.g. can be a cassette tape recorder to record steering control signals and/or other control input/output signals provided at the microcomputer 31 for later analysis if desired, which could be useful for troubleshooting. A tractor speed signal and wheel position signal source 20 can also be connected to microcomputer 31 which can be used as an input to guidance software enabling the microcomputer to control the degree of turning required for the steering control.

While the above has described the basic structure and algorithms for determining distance between the MMU and SST, it will be recognized that should the distance between the MMU and SST be equal to or exceed one wavelength of the signal 35, the measured phase differential will be ambiguous. To resolve the ambiguity a second signal 36 is generated by oscillator 27 which is a large fraction of the frequency of the first signal, preferably 99% for example. The two signals 35 and 36 are sent as alternating frequency CW bursts, in a manner to be described later. The SST in turn transmits alternating frequency signals of the same two frequencies in sequence which are received by the MMU while it is not transmitting. The lower frequency has of course a longer wavelength than the higher frequency signal. The MMU can determine the distance between it and the SST for both wavelength signals.

The radio frequency signal travelling a distance d from a source to a destination will have a phase difference at the destination of $d/y \times 360°$, where y is the wavelength of the signal. The distance between source and destination is thus $$d = y(pd/360°) + ny$$

where $y =$ the wavelength of the signal,
  $pd =$ the phase difference between the source and destination,
  $n =$ an integer.

The last term is present to account for the signal travelling a distance greater than 1 wavelength, n being the number of wavelengths in excess of the fraction of the wavelength between source and destination. The phase detector 30 provides to the microcomputer a signal allowing it to solve the first term of the aforenoted equation.

To solve for n, the distance d is determined for both frequencies in the same manner. Since the distance is the same, the microprocessor equates the equations, resulting in a value for n.

By making the second frequency 99% of the first, n will be resolved for 100 wavelengths, at which time another ambiguity will exist. If the difference in frequencies is smaller, the distance at which the ambiguity exists is increased. However this will require more accurate determinations of phase, increasing the cost of the equipment. The use of a second frequency corresponding to the frequency ratio noted above was selected because it had been determined that phase readings could be obtained to less than about 1% of a cycle with relatively inexpensive equipment.

Using the frequencies of 27.125 and 26.83575 MHz noted above, which have wavelengths of about 11.11 meters, the first gross ambiguity will occur at $11.11 \times 100$ meters.

In order to resolve the gross ambiguity a discontinuity in the CW signal from the MMU is generated. This can be obtained by abruptly inverting the phase of signal 35 180°. This discontinuity, received by antenna 26A and passing through receiver 28 is detected and causes a high speed counter (described and shown later with reference to FIG. 3) connected to microcomputer 31 to begin counting.

The transmitted discontinuity is also received at antenna 26A', and passes through receiver 28' to a high speed counter which is caused to start counting in SST 15.

Subsequently microcomputer 31' causes a discontinuity to be generated in the signal generated by oscillator 27'. This is transmitted by transmitter 25' via antenna 26' and is received at antenna 26A and antenna 26A'. When this discontinuity is detected in the SST, the high speed counter in SST 15 is stopped. Its value is stored in a local memory of the microcomputer 31'. Similarly when the signal with the discontinuity from SST 15 is detected at the MMU, the high speed counter in MMU 14 is stopped and its value is stored in a local memory of microcomputer 31.

The SST 15 is then caused by its microcomputer 31 to transmit a signal which has encoded the current value reached by the high speed counter of the SST. This value constitutes the circuit delay and the delay between reception of a discontinuity and transmission of a discontinuity within SST 15 The value reached by the counter of the MMU 14 constitutes the signal delay time between transmission from the MMU to the SST, the delay within the SST, and the return transmission time from the SST to the MMU. Having received the SST delay time from the SST, the microcomputer 31 substracts it from the stored value reached by its high speed counter, and thus provide the timing for the two wave propagation link between the MMU and the SST.

The local storage of the count reached on the counters can of course be made on the counters themselves.

Because it has been found that the resulting determined distance value is insufficiently precise for the short ranging system, it is used merely to resolve the 100 wavelength distance ambiguity.

Programs for operation of each procedure are stored in the memory of each microcomputer, with differerences between the programs at each SST. The same signal sent from the MMU is received by each SST, and upon internal synchronization, the various procedures are carried out at different times. For example the time for transmission from the second SST will be delayed until sufficient time has elapsed for transmission from the first SST to be completed. Since both SSTs transmit at the same frequencies, the MMU will recognize from the timing following its transmission which SST is returning a signal.

In addition each SST must also be able to distinguish whether a legitimate signal is being received from the MMU, and must automatically set its gain, as well as its internal phase shift as described above. These matters will be clarified below, using an SST circuit as an example.

Figure 3:
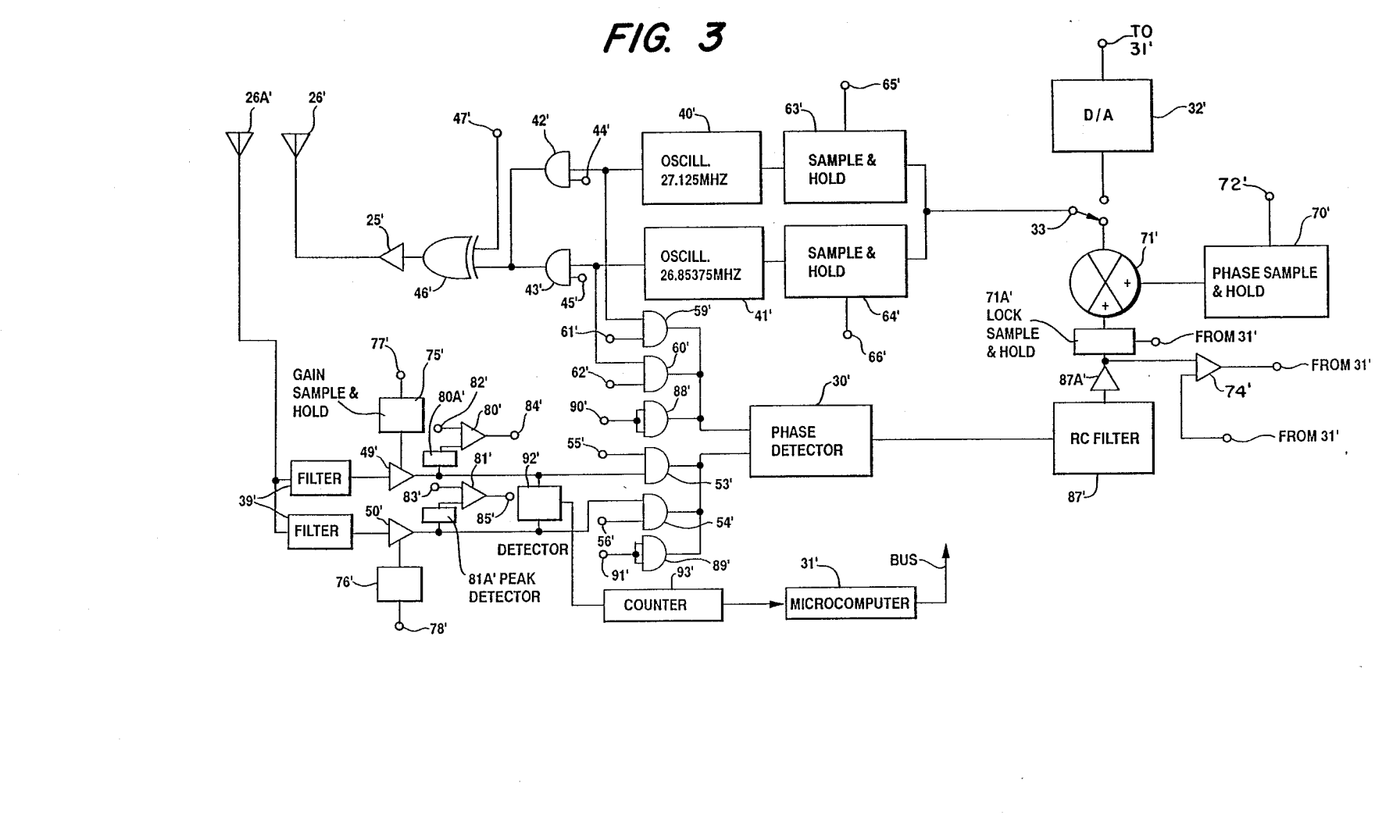
FIG. 3 is a logic diagram of the basic structure which can be used either as the MMU or SST.

FIG. 3 shows a logic diagram of the basic circuit of an SST which is similar to the basic circuit of the MMU.

A receiving antenna 26A' is connected within a receiver to the inputs of bandpass filters 39', each of which is tuned to a corresponding oscillator frequency, i.e. in this preferred embodiment 27.125 MHz and 26.85375 MHz.

The outputs of the filters 39' are connected to inputs of corresponding amplifiers 49' and 50', to which level controllers 75' and 76' are respectively connected. The level controllers, which can be gain sample and hold circuits, have inputs 77' and 78' which are controlled by microcomputer 31'

The outputs of level controllers 49' and 50' are connected to respective inputs of peak detectors 80A' and 81A', for provision to the microcomputer 31'. Analog to digital converters for providing their output signals to the microcomputer are formed by level detectors 80' and 81' which each have an input connected to the output of a corresponding peak detector. The output of the level controllers are also connected to individual inputs of AND gates 53' and 54'. A signal discontinuity detector 92' is connected to both outputs of level controllers 49' and 50', and has its output connected to the input of high speed counter 93', which has its output connected to an input of microcomputer 31'. Each of AND gates 53' and 54' has a second input 55' and 56' connected to control outputs of microcomputer 31'. The outputs of AND gates 53' and 54' are connected to an input of phase detector 30'

Oscillators 40' and 41', preferably voltage controlled oscillators, output two frequencies, one of which is a very large fraction of the other, e.g. 27.125 MHz and 26.85375 MHz, into respective inputs of AND gates 42' and 43', AND gates 42' and 43' have control inputs 44' and 45' connected from microcomputer 31. The outputs of AND gates 42' and 43' are connected together to an input of EXCLUSIVE OR gate 46', which also has a second input 47' connected to microcomputer 31'. The output of EXCLUSIVE OR gate 46' is connected to the input of a transmitter 25', the output of which is connected to transmitting antenna 26'

The outputs of oscillators 40' and 41' are also connected to respective inputs of AND gates 59' and 60', each of which has second inputs 61' and 62' connected to microcomputer 31'

The output of phase detector 30' is connected to the input of an analog filter 87', such as an R/C filter. The output of filter 87 is connected through an operational amplifier 87A' to an analog-to-digital converter (for application to the microcomputer 31'), comprising comparator 74' and to a sample and hold circuit 71A' which can be locked or unlocked by microprocessor 31'. The output of the sample and hold circuit 71A' is connected to one input of a summing circuit 71'. Another input of summing circuit 71' is connected from the output of a sample and hold circuit 70', which has a phase voltage input 72' connected to microcomputer 31'.

The output of summing circuit 71' is connected through switch 33' (which of course can be an electronic switch) to the inputs of sample and hold circuits 63' and 64', each of which have enable inputs 65' and 66' from microcomputer 31'. The outputs of sample and hold circuits 63' and 64' are connected to frequency control inputs of the respective oscillators 40' and 41'.

Switch 33' also can switch the inputs of sample and hold circuits 63' and 64' to the input of digital-to-analog converter 32', which has its input connected to microcomputer 31', and is switched thereto when the circuit is used as the MMU as described with reference to FIG. 2a.

The various enable inputs from the microcomputer are generally not shown, but will be understood by a person skilled in the art, as would be the bus system for providing various signals from the microcomputer to the various elements.

The fundamental operation of the circuit will now be described with reference to one of the signal frequencies. Operation with respect to the second will be similar.

A CW signal is generated by oscillator 40' and passes through AND gate 42', EXCLUSIVE OR gate 46', transmitter 25' and antenna 26'. This signal is received via antenna 26A', and passes through filter 39' and amplifier 49'. The signal is received in level detector 80', its output being monitored by microcomputer 31'. A gain adjustment signal is applied to terminal 77' of the level controller 75' from microcomputer 31' to bring the output signal level from amplifier 49' to a predetermined level.

The output signal from amplifier 49' is also applied to one input of AND gate 53' from the output of which, upon applying an input to terminal 55' by microcomputer 31', the received signal is applied to an input of phase detector 30'. The output signal of phase detector 30' is passed through filter 87' and after being amplified in operational amplifier 87A', is applied to one input of comparator 74'

An output voltage from microcomputer 31 is applied to the second input of comparator 74' and is compared in comparator 74' with the received signal signal passing through operational amplifier 87A'. The phase of the input signal is thereby read by microcomputer 31'.

AND gate 59' is enabled by the microcomputer applying a signal to its second input 61'. Switch 33' is switched into the position shown in FIG. 3. The signal from the local oscillator 27' which of course is at the same frequency as the input signal at antenna 26A' is applied through AND gate 59' to the second input of phase detector 30'. Now the phase of the signal generated by local oscillator 27' is locked to the incoming signal in comparator 74' in a manner to be described below.

With switch 33' in the position shown, the filtered signal generated in oscillator 40' is returned via summing circuit 71' to sample and hold circuit 63' the output of which is applied to the control input of oscillator 40'. A loop for phase locking is thus formed.

The microcomputer 31' applies a signal to phase sample and hold circuit 70' via its input 72', the output of which is applied to summing circuit 71' with the filtered and amplified output from phase detector 30' of the signal generated in the oscillator 40'. The signal applied from microcomputer 31' to phase sample and hold circuit 70' is adjusted in order to add delay and offset the lock phase shift, so that the output signal from oscillator 40' transmitted at antenna 26' will be in phase with the received signal at antenna 26A'. The value of the received offset is stored in a memory of microcomputer 31'

The signal thus transmitted from oscillator 40 passing through AND gate 42', exclusive OR gate 46' and transmitter 29' and antenna 26' is thereby compensated for the net phase shift of the local circuit. AND gate 42' is used to allow the passage of a signal from the oscillator 40' to transmitter 25' or to inhibit it.

Operation of the circuit with respect to the second frequency signal is similar to that of the first signal, except that filter 39', amplifier 50', level controller 76', AND gate 54', sample and hold circuit 64', oscillator 41', AND gate 60' and AND gate 43' are used, in a directly analogous manner to the corresponding previously noted elements. AND gates 88' and 89' connected to the inputs of phase detector 30' and operated by the microcomputer are used to disable the corresponding inputs to the phase detector.

As noted earlier, suddenly phase reversing one of the signals 180° will create a discontinuity in the CW signal. Discontinuity detector 29' detects the discontinuity in the received signal, and enables counter 93'. Counter 93', once enabled, provides its count output to microcomputer 31'. Creation of a discontinuity in the transmitted signal is obtained by the microcomputer disabling EXCLUSIVE OR gate 46'.

Microcomputer 31' should contain programs either in software or firmware to perform the algorithms described herein. Both of the active remote reflectors will receive both signals transmitted from the MMU, and operate their procedures individually, being distinguished in operation by their timing. It should also be noted that recognition of received signal pulse bursts by microcomputer 31 is effected through peak detectors 80A' and 81A'. Microcomputer 31' is thus able to synchronization times and coded pulses for subsequent interpretation.

Assuming now that the circuit of FIG. 3 refers to an MMU, with switch 33' connecting the input of sample and hold circuit 63' and 64' to the output of digital-to-analog converter 32', AND gate 44' and 45' are alternately enabled by the microcomputer 31', with EXCLUSIVE OR gate 46' enabled, to alternately cause 27.125 MHz and 26.85375 MHz locally oscillated signals to pass through transmitter 25' and antenna 26'. Preferably the different frequency signals are transmitted in alternate 2 millisecond bursts over a time of e.g. 600 milliseconds.

Considering FIG. 3 as representing the SST with switch 33' in the position shown, at initialization and at later intervals the two millisecond alternate frequency bursts are received and detected as described earlier, passing through the filters, amplifiers 49' and 50' and peak detectors 80A' and 81A', to microcomputer 31'. During this interval the microcomputer 31' determines that the received signals are in fact true signals and not noise.

The alternate frequency bursts then cease for a quiet time, e.g. 25 milliseconds, and another burst of single frequency signal is transmitted from the MMU. This is received by both SSTs; the first leading edge is used for synchronization of both SSTs. Following one or a few additional bursts during which time the local synchronization is finely adjusted, a longer burst of one frequency followed by an equal interval burst of the second frequency, e.g. both of about 20 milliseconds are preferably transmitted by the MMU, during which time the SST microcomputers adjust the gains of amplifiers 49' and 50'.

According to a preferred embodiment of the present invention two separate bursts at one frequency are transmitted from the MMU to the SST, and during the interval between them a signal of the second frequency is transmitted. Gains and levels at the SST are adjusted during those bursts.

Adjustments for both frequencies are made at both SSTs simultaneously. However following adjustment, first one SST and then the second SST, with timing determined by the local computer program, transmits similar signals to the MMU, e.g. two 20 millisecond bursts of one frequency signal separated by a single 20 millisecond burst at the second frequency.

The SSTs then receive signals from the MMU, each frequency in sequence, during which the circuit phase shift is first read, then the phase lock loop closed and its phase adjusted several times as described earlier.

It should be noted that following the transmission of the synchronization pulse leading edge, it is preferred that a code signal should be transmitted, for example comprised of a start bit, a parity bit, an 8 bit data word at one of the two frequencies, which can provide instruction of which procedure to follow, a measurement of circuit delay, etc. Alternatively, or in conjunction, the time of a burst interval can indicate which program procedure to follow.

Programs at each SST and at the MMU thus proceed to operate the transmitters and receivers at a predetermined time sequence following the initial transmission of the alternate frequency 2 millisecond bursts from the MMU. Those cause the gains and internal circuit phase corrections to be corrected as described. The above initialization is effected with the MMU located on the field.

Figure 4:
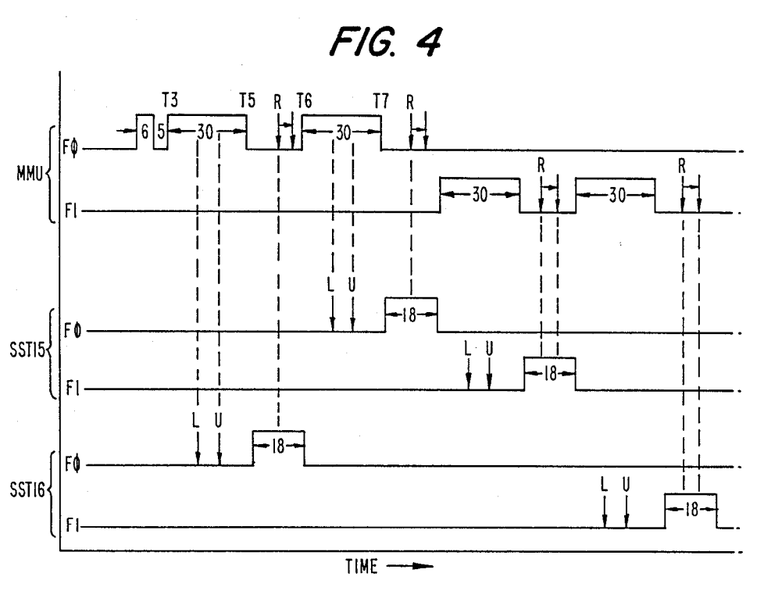
FIG. 4 is a signal timing diagram used to describe operation of the invention.

FIG. 4 is a time sequence diagram illustrating functions during normal operations, following initialization. In the first time line MMU/FO, the MMU transmits a 6 millisecond burst (labelled 6) at one frequency FO which indicates to both SSTs that a particular software routine should be implemented. After a silent interval, e.g. 5 milliseconds (labelled 5) terminating at time T3, a long burst at the same frequency is transmitted by the MMU terminating at time T5. The rising edge of the burst starting at time T3 is used by both SSTs for synchronization. After a short interval, e.g. two milliseconds into the long burst, SSTs 16 locks its phase lock loop at the time indicated in time line SST16/FO by the arrow L. After a short interval it unlocks its phase locked loop at the time, indicated by the arrow U.

The MMU ceases the burst OF at time T5, and following cessation of the burst, the local oscillator at FO (27.125 MHz) of SST16 is then allowed to free run at its frequency, and at phase with which it was locked. As a result it transmits back a burst at the same frequency, e.g. for 18 milliseconds as indicated on the time line SST16/fO. Following that 18 millisecond burst the MMU reads the phase, at the time indicated at the left hand arrow R on time line MMU/FO. Preferably a number of readings is made, e.g. 16, whose readings are interpolated will be described below. It has been found that the first reading should be made about 12 milliseconds after the termination of the burst at time T5 in order that the MMU should stabilize.

While the MMU reads the phase of the received signal, due to the unlocked nature of the oscillator of the SST, it will likely drift. The measured phase at the MMU will show drift, the phase values of which are stored in the microcomputer of the MMU. After completion of the measurements the microcomputer should interpolate the measured phase values to the time at which the MMU ceased transmitting in order to obtain an assumed undrifted phase value.

Following termination of the burst at FO from SST 16, the MMU transmits another long burst (e.g. 30 milliseconds) at the same frequency starting at time T6. During that interval SST 15 first locks (L), then unlocks (U) its phase locked loop in a manner analogous to SST16, as indicated on time line SST15/FO. The MMU then ceases transmission at time T7, and SST 15 transmits an 18 millisecond burst at the same frequency which is read e.g. 16 times following a settling interval, in a similar manner as the phase was read from the signal burst from SST 16.

During this interval the second frequency signal was silent. However now the MMU transmits at F1 (e.g. 26.85375 MHz) two bursts separated by a silent interval, see time line MMU/F1. During the first burst, SST 15 first locks (L) then unlocks (U) its phase lock loop (see time line SST15/F1, and then once the first burst at F1 from the MMU has terminated, it transmits a burst at the same frequency (e.g. 18 milliseconds) with its oscillator free running at the same frequency and phase to which it was locked while the phase locked loop was closed. This signal is read (R) multiple times and the phase interpolated at the MMU in a similar manner to that described above, see time line MMU/F1.

During the second 30 millisecond signal burst at the frequency F1 from the MMU, the SST 16 is first locked (L) and then unlocked (U) as described earlier (time line SST16/F1. Following termination of the second 30 millisecond burst, SST 16 returns a burst in phase with the second frequency F1 as described earlier, e.g. for 18 milliseconds. That signal is read (R) multiple times at the MMU in a similar manner as described earlier, see time line MMU/F1.

Using the above sequence the MMU has read the phase differences, and therefore can determine the distance of each SST from the MMU as described earlier. The entire sequence is repeated continuously in order that the MMU should be able to obtain a continuous updating of its position relative to the two SSTs.

As noted earlier, distance determination is effected by subtracting the phase differences between the first frequency signal and the first frequency return signal from an SST, and the second frequency signal and the second frequency return signal from the same SST and multiplying the result by the wavelength of the first frequency signal divided by the difference of the wavelengths of the first and second frequency signals. This is repeated for the signals received by and transmitted from the second SST. As long as the MMU is on one side of base line joining the two SSTs, it can determine its precise location by trilateralization in a well known manner after accurately determining the mutual distances between the MMU and SSTs as described herein, and either display the position on a display screen or subtract its position from a predetermined position stored in memory and apply different signals to a steering controller for the vehicle.

In the sequence shown in FIG. 4, the reading from a particular SST was received between two transmitted bursts. Internally within the MMU the phase of its own transmitted signal was determined. Since two bursts were transmitted, the average of the internal phase differences can be used to determine the phase at the time of reading of the response or reflection signals from the SST, i.e. an average is used.

Thus by using the two frequencies as described above, the multiple wavelength distance ambiguity can be resolved.

As noted earlier for a 1% difference between the frequencies of the two signals, another distance ambiguity will occur at one hundred wavelengths. It was noted that this is preferably resolved by transmitting a discontinuity or the equivalent in the CW signal which can be sensed and the distance determined as will be described below. A phase discontinuity such as abruptly changing the phase of the CW signal is the preferred source of the discontinuity.

Under control of the microcomputer the EXCLUSIVE OR gate is disabled, and as a result the phase of the signal passing therethrough is reversed. The resulting phase discontinuity at the MMU is received in its own receiving circuit by its equivalent of detector 92', which causes its counter to begin counting. At the SST the discontinuity is also received, and starts its own counter 93' in response. Thus counter 93' thus is started following the transmission time of the phase discontinuity from the MMU to the SST.

At the SST the phase of the transmitted CW signal is abruptly changed after some interval by disabling EXCLUSIVE OR gate 46'. Upon receiving that phase discontinuity via antenna 26A', the SST stops its counter, the count of which is accessed by microcomputer 31'. Following the transmission interval of the signal discontinuity from the SST to the MMU, the counter at the MMU is stopped, and the count is accessed by its local microprocessor. At the SST, a digital signal preferably comprised of bursts of one of the frequencies and having the count of the counter 93' encoded thereon, microcomputer 31', is transmitted to the MMU. This sequence need only be repeated infrequently, for example after every 100 distance determination cycles.

The count on the counter at the MMU represents the time for transmission of a discontinuity to the SST, and the delay between the time of reception of that discontinuity and the transmission time of a return discontinuity at the SST, and the transmission interval of that discontinuity signal back to the MMU. Upon receiving the delay interval count from the reception to the transmission of the discontinuity at the SST transmitted from the SST as an encoded CW signal as noted earlier, it is subtracted from the count of the counter at the MMU. That result, the count multiplied by the time between counts represents twice the distance between the first transmitter and the reflector. A gross indication with relatively course resolution (neglecting phase shifts and the like within the SST and MMU) is thus obtained, resolving the one hundred wavelength ambiguity.

It should be noted that a phase discontinuity need not be used, as long as a recognizable equivalent special point on the CW signal is transmitted by the MMU and received.

While separate transmitting and receiving antennae have been described, it should be noted that a single antenna could be used to apply the transmitted signal back to the receiving circuit within the SST or MMU if an attenuator ahead of the filters 39' is used. However it has been found that phase shift within the antenna can be included in the phase determinations by utilizing separate antennae as described herein, and that the result is more accurate.

During the initialization procedure, programs stored within the SSTs can cause one SST to operate as an MMU as described above and determine its distance to the other SST. It then sends a signal representing the distance, e.g. in code, to the MMU for storage and later use as a baseline in the trilateralization determination.

The above described system has been found to provide a highly accurate determination of a vehicle carrying the MMU within a field, i.e. to a resolution of about 1½ inches, over distances greater than 1 wavelength, and indeed can determine the location to sufficient accuracy over at least hundreds of wavelengths, given reasonable separation of the SSTs. Consequently a vehicle can be controlled over a complete section of land in an accurate and unambiguous manner, without the requirement to move the SSTs and with an accuracy considerably improved over prior art systems.

The system described can of course be used for other applications, such as control or location of a vehicle on a road, mapping, etc Variations in the above-described invention may now be designed by persons skilled in the art understanding the invention. All are considered to be within the sphere and scope of the invention as defined in the claims appended hereto.

We claim:
1. A ranging system comprising:
   (a) first means for transmitting a first continuous wave (CW) signal for a predetermined period of time, and for generating a second CW signal for a predetermined period of time at a frequency which is a very large fraction of the first CW signal,
   (b) an active remote reflector for generating and transmitting a first reflection signal at least initially in phase at the reflector with the first CW signal, and for generating and transmitting a second reflection signal initially in phase at the reflector with the second CW signal following transmission of the second CW signal,
   (c) means at the first means for receiving the first reflection signal and comparing its phase with the phase of the first CW signal whereby an apparent distance between the first means and reflector can be determined,
   (d) means at the first means for receiving the second reflection signal and comparing its phase with the second CW signal, and
   (e) means at the first means for providing a distance indicating signal corresponding to a result obtained by subtracting the phase differences of the first CW signal and received first reflection signal and the second CW signal and received second reflection signal and multiplying the result by the wavelength of the first CW signal divided by the difference between the wavelength of the first CW signal divided by the difference between the wavelengths of the first and second CW signal, the distance indicating signal representing an integral number of wavelength in excess of a fraction at which the first means is distance from said remote reflector.

2. A ranging system as defined in claim 1 including means for transmitting the second CW signal following completion of the first reflection signal.

3. A ranging system as defined in claim 2 including means for retransmission of the first CW signal following completion of the second reflection signal, and means at the first means for averaging the phase difference of the first CW signal and the first reflection signal resulting from the first and repeated transmission of the first CW signal and for using the average phase differences as the difference between the first CW signal and first reflection signal in providing said distance indication signal.

4. A ranging system comprising:
   (a) a first transmitter for transmitting a first continuous wave (CW) signal for a predetermined period of time,
   (b) an active reflector remote from said transmitter comprising:
      (i) means for receiving said first CW signal,
      (ii) phase locked loop means for receiving a signal corresponding to said CW signal from the receiving means and locking its phase thereto;
      (iii) firsts compensation means for actively determining circuit phase delay within the active reflector,
      (iv) a second transmitter for transmitting a first CW reflection signal at a predetermined frequency with initial phase defined by the phase locked loop means, compensated by the circuit phase delay, after termination of said first CW signal,
   (c) means at said first transmitter for receiving said first CW signal and the reflection signal, for comparing the phases of said CW signal and the reflection signal, and for providing a signal corresponding to the apparent distance between the transmitter and active reflector related to the phase difference thereof, and
   (d) compensation means for actively determining the circuit phase delay within the first transmitter and receiving means at the first transmitter and for subtracting the latter circuit phase delay from the phase of the first CW signal upon comparing it with the received reflection signal.

5. A ranging system comprising:
   (a) a first transmitter for transmitting a first continuous wave (CW) signal for a predetermined period of time,
   (b) an active reflector remote from said transmitter comprising:
      (i) means for receiving said first CW signal,
      (ii) phase locked loop means for receiving a signal corresponding to said CW signal from the receiving means and locking its phase thereto;
      (iii) first compensation means for actively determining circuit phase delay within the active reflector,
      (iv) a second transmitter for transmitting a first CW reflection signal at a predetermined frequency within initial phase defined by the phase locked loop means; compensated by the circuit phase delay, after termination of said first CW signal,
   (c) means at said first transmitter for receiving said first CW signal and the reflection signal, for comparing the phases of said CW signal and the reflection signal, and for providing a signal corresponding to the apparent distance between the transmitter and active reflector related to the phase differences thereof,
   (d) means at the first transmitter for transmitting a second CW signal having a frequency which is a very large fraction of the frequency of the first CW signal for a predetermined period of time,
   (e) means at the active reflector for receiving said second CW signal, phase locked loop means for receiving a signal corresponding to said second CW signal from the latter receiving means and locking its phase thereto, means for actively determining circuit phase delay within the active reflector, and means for transmitting a second CW reflection signal at said second predetermined frequency with the initial phase defined by the latter phase locked loop means compensated by the circuit phase delay after termination of said first CW signal,
   (f) means at said first transmitter for receiving the second CW signal and the second reflection signal, for comparing the phases of the second CW signal and the second reflection signal, and
   (g) means at said first transmitter for providing a distance indicating signal corresponding to a result obtained by subtracting the phase differences of the first CW signal and first reflection signal and the second CW signal and second reflection signal and multiplying the result by the wavelength of the first CW signal divided by the difference between the wavelength of the first and second CW signal, the distance indicating signal representing an integral number of wavelengths in excess of a fraction at which the first means is distant from said remote reflector.

6. A system as defined in claim 5 including means at the first transmitter for transmitting the second CW signal following termination of the first reflection signal.

7. A system as defined in claim 6 including means for repeating transmission of the first CW signal following termination of the second reflection signal, and further means at the first transmitter for averaging the phase differences of the first CW signal and the first reflection signal resulting from the first and repeated transmission of the first CW signal and for using the averaged phase differences as the difference between the first CW signal and first reflection signal in providing said distance indication signal.

8. A ranging system comprising:
(a) a first transmitter for transmitting a first continuous wave (CW) signal for a predetermined period of time,
(b) an active reflector remote from said transmitter comprising:
 (i) means for receiving said first CW signal,
 (ii) phase locked loop means for receiving a signal corresponding to said CW signal from the receiving means and locking its phase thereto;
 (iii) first compensation means for actively determining circuit phase delay within the active reflector,
 (iv) a second transmitter for transmitting a first CW reflection signal at a predetermined frequency with initial phase defined by the phase locked loop means, compensated by the circuit phase delay, after termination of said first CW signal,
(c) means at said first transmitter for receiving said first CW signal and the reflection signal, for comparing the phases of said CW signal and the reflection signal, and for providing a signal corresponding to the apparent distance between the transmitter and active reflector related to the phase difference thereof, and
further including means at the first transmitter for impressing a first discontinuity on the CW signal and for starting a first counter upon transmission of said discontinuity, means at the reflector for sensing the discontinuity and for starting a second counter in response thereto, means at the reflector for impressing a second discontinuity on the reflection signal and for stopping the second counter upon transmission of the second discontinuity, means at the first transmitter for stopping the first counter upon reception of the second discontinuity, means at the reflector for transmitting a signal coded to the value held by the second counter, and means at the first transmitter for receiving the latter signal and for subtracting the value held by the second counter from the value held by the first counter to obtain a distance indicating signal corresponding to twice the distance between the first transmitter and the reflector.

9. A system as defined in claim 8 in which the discontinuity compressing means are means for causing abrupt phase reversal in the signal.

10. A ranging system comprising:
(a) a first transmitter for transmitting a first continuous wave (CW) signal for a predetermined period of time,
(b) an active reflector remote from said transmitter comprising:
 (i) means for receiving said first CW signal,
 (ii) phase locked loop means for receiving a signal corresponding to said CW signal from the receiving means and locking its phase thereto;
 (iii) first compensation means for actively determining circuit phase delay within the active reflector,
 (iv) a second transmitter for transmitting a first CW reflection signal at a predetermined frequency with initial phase defined by the phase locked loop means, compensated by the circuit phase delay, after termination of said first CW signal,
(c) means at said first transmitter for receiving said first CW signal and the reflection signal, for comparing the phases of said CW signal and the reflection signal, and for providing a signal corresponding to the apparent distance between the transmitter and active reflector related to the phase difference thereof, and
(d) said comparing means comprising means for comparing the phases of the reflection signal and the CW signal multiple times in succession to determine phase differences and for interpolating the phase differences to the time just at or prior to the completion of said predetermined period of time,
whereby a phase comparison of the CW signal and the reflection signal can be made devoid of said drift in phase.

11. A ranging system comprising:
(a) a master unit for transmitting a first CW signal during a predetermined interval,
(b) an active reflector for transmitting a second CW signal initially in phase at the reflector with the first CW signal following aid interval,
(c) said master unit including means for measuring the phase of the second CW signal received at the master unit multiple times in succession, determining any drift of its phase over time, and for interpolating its phase to the time just at or prior to the completion of said interval,
whereby a phase determination of the second CW signal devoid of said phase drift is obtained at the master unit.

12. A ranging system as defined in claim 11 including means for comparing the first CW signal with the phase determination of the second CW signal to provide a signal corresponding to the apparent distance between the transmitter and active reflector.

* * * * *